Feb. 3, 1959  R. T. BURNETT  2,871,992
AXIALLY AND TRANSVERSELY MOVABLE BRAKE
Filed March 7, 1955
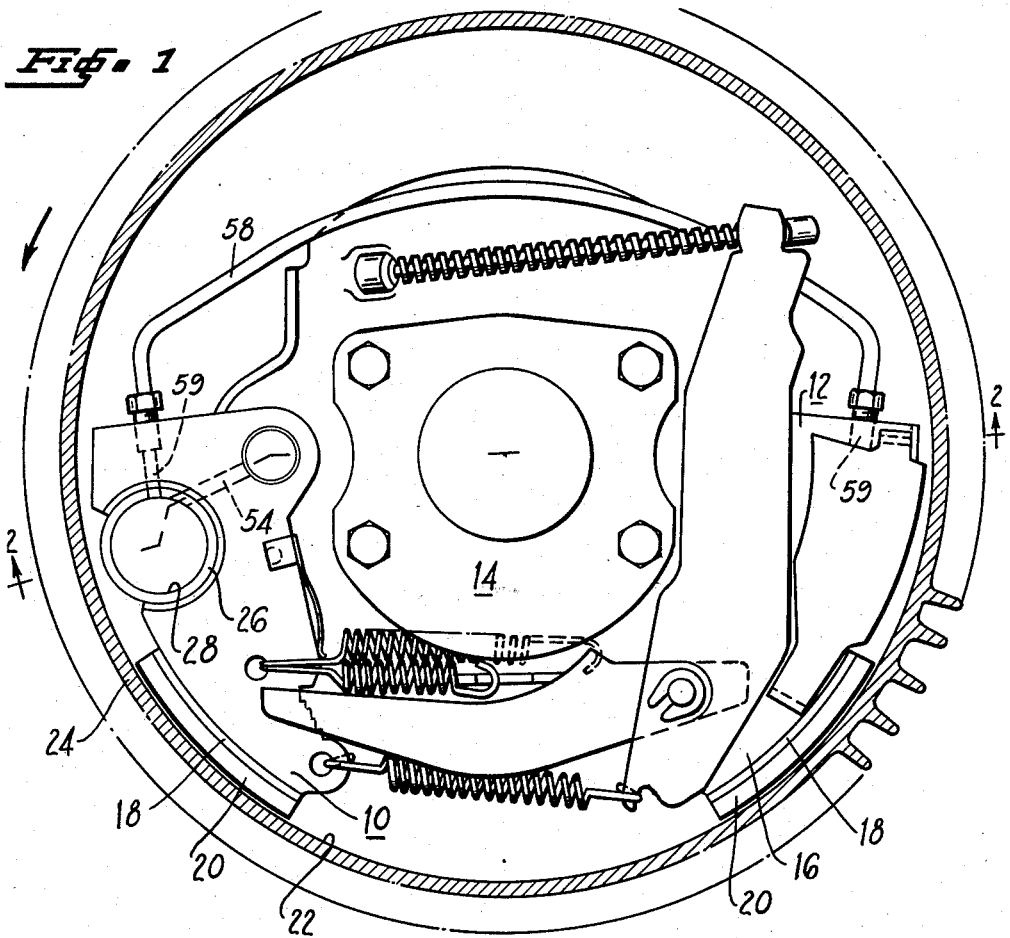
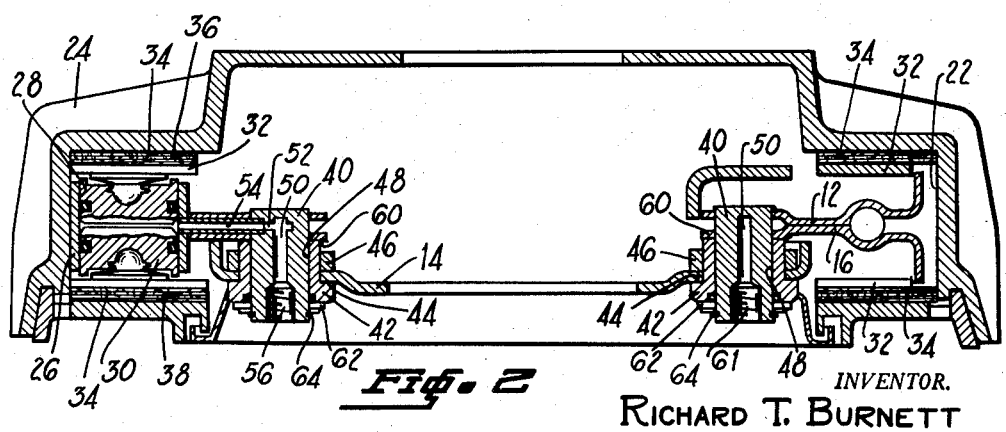
INVENTOR.
RICHARD T. BURNETT
BY John A. Young
ATTORNEY United States Patent Office 2,871,992
Patented Feb. 3, 1959

2,871,992

AXIALLY AND TRANSVERSELY MOVABLE BRAKE

Richard T. Burnett, South Bend, Ind., assignor to Bendix Aviation Corporation, South Bend, Ind., a corporation of Delaware Application March 7, 1955, Serial No. 492,422

8 Claims. (Cl. 188—70)

This invention relates generally to brakes, and more specifically to a composite disk and shoe brake unit in which one friction element supplies applying effort for the other. The basic invention of the composite friction unit is illustrated in my copending applications, No. 369,197 filed July 20, 1953 and No. 392,177 filed November 16, 1953.

A consideration of the organization of the braking systems in these two referenced applications will disclose that the hydraulic system utilizes a fixed anchor post and a movable bushing which is pivotally received on the anchor post. Because of this, it is necessary to transfer fluid between a fixed anchor and a movable surrounding bushing; hence there is a movable wall defining a fluid chamber through which it is necessary to transmit hydraulic fluid.

This arrangement, while satisfactory in many respects, requires provision for sealing surfaces on either side of the fluid chamber formed within the anchor member. Each sealing surface represents a potential source of hydraulic failure, and hence this invention proposes one method, an illustrative form, by which the number of sealing surfaces can be reduced. It is possible in this way to minimize the danger of hydraulic fluid loss.

According to these foregoing remarks it is a principal object of the invention to reduce the possibility of leakage of fluid within the brake by eliminating transference of fluid pressure between relatively movable parts.

Another object of the invention is to obtain a hydraulic fluid system which eliminates necessity for seals between the hydraulic fluid inlet and the fluid motor.

Other objects and advantages of the invention will become apparent from a consideration of the following description which refers to the accompanying drawings in which:

Figure 1 is a side elevation of a brake having the invention incorporated therein, the left hand brake unit being shown removed; and Figure 2 is a section view taken on the line 2—2 of Figure 1.

Referring to the drawings, there are provided two brake units 10 and 12 which are carried by a support plate 14. Each of the brake units is identically constructed except for certain features irrelevant to this invention. Each friction unit is inclusive of a web 16 and a transverse rim 18 formed along a segment of the periphery of the web 16. The rim 18 has friction material lining 20 which is engageable with surface 22 of rotor 24 during a brake application. Perpendicularly mounted in web 16 is a fluid motor 26 which is inclusive of a cylinder 28 and oppositely acting pistons 30 slidably received in the cylinder 28.

Disk friction elements 32 are carried by the fluid motor 26 and are spread apart by the pistons 30, thus bringing friction material lining 34 into forcible engagement with surfaces 36 and 38 of rotor 24. The disk friction elements are removed from unit 10 in Figure 1 to better show the fluid motor 26.

A laterally extending post 40 is attached to units 10 and 12. The post is located perpendicularly to webs 16 which are bifurcated at the point of attachment with the anchor post 40 (Fig. 2). The webs and posts are welded together or otherwise suitably fixed one to the other. However, the invention is not limited to any specific method of fastening these two members. They may even be made integrally, as for example, by casting.

An anchor sleeve 42 is fastened to support member 14. The support member 14 is clamped between shoulder 44 of the sleeve 42 and collar 46. The collar 46, anchor sleeve 42 and support member 14 may be joined together by hydrogen brazing, and in this manner the anchor sleeve 42 is held in an upright fixed position on the support member. The anchor sleeve has an opening 48 through which the laterally extending post 40 extends. The post 40 is journaled in the anchor sleeve 42 and turning of the post 40 is thus permitted when the friction unit pivots during brake application.

A longitudinal bore 50 is formed in the laterally extending post 40, and this bore 50 intersects a radial bore 52 also formed in the anchor post. A conduit 54 connects with radial bore 52 and leads to the fluid motor 26. A port 56 is formed in the end of the passage 50 of the post to provide a fluid inlet.

The post in unit 10 provides hydraulic fluid inlet to the system, and an external conduit 58 interconnects the fluid motors in the two brake units via passages 59 so that the disk elements in each unit are simultaneously applied. The post in unit 12 is provided with a bleed port 61 corresponding to the inlet port in the post of unit 10.

The post 40 (and thus the brake unit) is prevented from moving laterally by abutment of the web 16 with a shoulder 60 on the anchor sleeve. Lateral movement in the other direction is prevented by a combination of washer 62 and retaining ring 64. By limiting lateral movement of the post 40 it is possible to define the position of the entire brake unit since the post and unit are rigidly interconnected.

Considering Figure 2, it will be seen that the components of the brake between the inlet port 56 and fluid motor 26 are all rigidly interconnected; fluid conductance is through members, all of which are relatively fixed. No fluid joints are formed between members which are relatively movable, hence the joints can more readily be made fluid tight.

In operation, fluid pressure from an appropriate source (not shown) is introduced through inlet port 56 in unit 10 where it is conducted to the fluid motor 26 via passages 50 and 52, and conduit 54. Fluid pressure which is communicated to the fluid motor 26 spreads the pistons 30 apart, forcing the lining 34 against surfaces 36 and 38 of rotor 24. Assuming counterclockwise rotor movement in the direction indicated by the arrow in Figure 1, each brake unit will be pivoted in a counterclockwise direction about the associated anchor bushing. The friction material lined rim of the left hand unit 10 in Figure 1 will move away from surface 22 of the rotor, and the friction material lined rim of the right hand unit 12 will be applied against surface 22 of the rotor.

When it is desired to bleed the brake, fluid pressure is developed causing fluid transfer through inlet port 56 in post 40 of unit 10, through the passages formed in the post, and the conduit 54, to the fluid motor 26 in brake unit 10; thence through conduit 59 and external conduit 58 to unit 12 where it flows through the fluid motor and conduits, and ultimately is discharged through the bleed port 61 formed in the post associated with unit 12.

Although the invention is described with only one illustrative embodiment, it is to be understood that the device is shown only in example form and that various modifications can be made by those skilled in the art without departing from the underlying principles of the invention. I intend therefore, to include within the scope of the following claims all equivalent structure through which is accomplished the same or substantially the same results.

I claim:

1. A brake unit comprising a web, an arcuate rim formed along a segment of the periphery of said web, friction material lining on said rim, a fluid motor transversely mounted in said web, a pair of oppositely-acting friction elements applied by said fluid motor, a post transversely received through said web and rigidly fixed thereto, a longtiudinally extending bore formed in said post, a radial bore in said post intersecting the longitudinal bore, a fluid conduit positioned in the web of said unit and interconnecting said radial bore and said fluid motor, a fixed anchor sleeve having an opening therein, said post being received through an opening in said sleeve and journaled therein to permit pivotal movement of the brake unit, and fastening means associated with said sleeve and post to prevent lateral movement of said brake unit.

2. A brake unit comprising a radially-applied first friction element, a fixed nonrotatable member in combination with said brake unit, a fluid motor carried by said brake unit, axially-movable friction elements actuated by said fluid motor, means interconnecting said first friction element and said axially-movable friction elements, said axially-movable friction elements being arranged to produce pivotal movement of the brake unit, said pivotal movement of the brake units serving to apply said first friction element, an elongated member axially received in said unit and rigidly connected thereto, a fixed sleeve, said sleeve being arranged to receive the elongated member and thereby permit pivotal movement of said unit, longitudinal and radial passages in said elongated member, a conduit carried by said unit and interconnecting the passages in said anchor and the fluid motor, and means limiting lateral movement of said elongated member in said sleeve whereby said unit is positioned, and means for fastening said sleeve to said nonrotatable member.

3. A brake unit including a radially-applied first friction element and axially-applied second friction elements, means operatively interconnecting said first friction element and said second friction elements, an axially extending member rigidly fixed to said unit, a fluid motor carried by said unit, a bearing receiving said axially-extending member permitting pivotal movement therein, passages formed in said axially-extending member, a conduit interconnecting said passages and the fluid motor, and means limiting lateral movement of said anchor in said bearing to thereby position said brake unit.

4. A pivoted brake unit comprising a fluid motor carried by said unit, oppositely-acting first friction elements which are axially-applied by said fluid motor, a second friction element radially-applied by pivotal movement of said unit produced by application of said first friction elements, means operatively interconnecting said first friction elements and said second friction elements, an anchor for said unit which is rigidly fixed thereto, a bearing for said anchor permitting turning of said anchor therein as said unit is caused to pivot, and passages formed in said anchor which interconnect with said fluid motor.

5. A pivoted friction unit having two friction elements, one radially-applied and one axially-applied, an axially extending anchoring means fixed to said unit and movable therewith, a fixed bearing receiving said anchoring means and fluid passages formed in said anchoring means, said fluid passages being interconnected with a pressure source for actuating said axially-applied friction element.

6. A pivoted friction unit comprising two friction elements, one radially-applied and the other axially-applied, an axial anchoring means for said unit rigidly fixed thereto, and a fixed bearing receiving said axial anchoring means and permitting turning of said pivoted anchoring means therein as said unit is caused to pivot, said unit being held in proper position by limiting lateral movement of said axial anchoring means within said bearing.

7. A pivoted brake unit comprising a fluid motor carried by said unit, friction elements which are axially applied by said fluid motor, means operatively joining said friction elements with said fluid motor, a portion of said unit being radially applied by pivotal movement of said unit produced by application of said friction elements, an anchor for said unit which is rigidly fixed thereto, a bearing for said anchor permitting turning of said anchor therein as said unit is caused to pivot, and passages formed in said anchor which interconnect with said fluid motor.

8. A brake unit including a web, a lined rim, a member rigidly secured transversely to said web, bearing means for receiving said member, a hydraulic passage formed in said member, a hydraulic actuator operatively connected to a pressure source through the passages in said member, said actuator being adapted to actuate said brake unit, and means for mounting said hydraulic actuator in the web of said brake unit.

References Cited in the file of this patent

UNITED STATES PATENTS

| | | |
|---|---|---|
| 2,323,052 | Klaue | June 29, 1943 |
| 2,602,525 | Jurgens | July 8, 1952 |

FOREIGN PATENTS

| | | |
|---|---|---|
| 482,556 | France | Jan. 5, 1917 |
| 700,803 | France | Jan. 2, 1931 |